(12) United States Patent
Barad et al.

(10) Patent No.: US 9,939,665 B2
(45) Date of Patent: Apr. 10, 2018

(54) COMMUNICATION APPARATUS

(71) Applicant: AIRBUS OPERATIONS LIMITED, Bristol (GB)

(72) Inventors: Kayvon Barad, Bristol (GB); Chris Wood, Bristol (GB); Alessio Cipullo, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 15/337,242

(22) Filed: Oct. 28, 2016

(65) Prior Publication Data
US 2017/0123236 A1 May 4, 2017

(30) Foreign Application Priority Data
Oct. 29, 2015 (GB) .................................. 1519132.3

(51) Int. Cl.
*G02F 1/01* (2006.01)
*G02B 6/02* (2006.01)
(Continued)

(52) U.S. Cl.
CPC ............ *G02F 1/0134* (2013.01); *G02B 6/022* (2013.01); *G02B 6/0208* (2013.01); *G02B 6/02204* (2013.01); *G02B 6/29383* (2013.01); *G02B 6/4287* (2013.01); *G02F 1/0147* (2013.01); *G02F 1/125* (2013.01); *H04B 10/2504* (2013.01); *H04J 14/02* (2013.01); *G02B 6/02076* (2013.01); *G02B 6/02095* (2013.01); *G02B 6/29395* (2013.01);
(Continued)

(58) Field of Classification Search
None
See application file for complete search history.

(56) References Cited

U.S. PATENT DOCUMENTS 5,889,901 A    3/1999   Anderson et al.
6,044,102 A *  3/2000   Labeyrie ............... H01S 5/0625
                                                      372/43.01
(Continued)

FOREIGN PATENT DOCUMENTS

EP    0 856 753      8/1998
JP    2006-113433    4/2006
(Continued)

OTHER PUBLICATIONS

European Search Report cited in EP 16196266.7, dated Feb. 14, 2017, seven pages.
(Continued)

*Primary Examiner* — Darren E Wolf
(74) *Attorney, Agent, or Firm* — Nixon & Vanderhye P.C.

(57) ABSTRACT

A communication apparatus includes an optical fiber along which radiation can be transmitted; an optical fiber grating formed within the optical fiber, the optical fiber grating having a structure, and configured to reflect radiation at a particular wavelength; and an instrument coupled to the grating and configured to controllably modify the structure of the grating, thereby changing the wavelength at which the grating reflects radiation. A communication system including the communication apparatus is also described, along with a method of communicating a signal.

30 Claims, 10 Drawing Sheets

(51) Int. Cl.
*H04B 10/25* (2013.01)
*H04J 14/02* (2006.01)
*G02F 1/125* (2006.01)
*G02B 6/42* (2006.01)
*G02B 6/293* (2006.01)

(52) U.S. Cl.
CPC .......... *G02B 6/4214* (2013.01); *G02B 6/4215* (2013.01); *G02F 2201/58* (2013.01)

(56) References Cited

U.S. PATENT DOCUMENTS

| | | | |
|---|---|---|---|
| 6,285,812 B1 | 9/2001 | Amundson et al. | |
| 2002/0041722 A1* | 4/2002 | Johnson | G01D 5/35383 385/12 |
| 2008/0107379 A1* | 5/2008 | Kobayashi | G02B 6/0218 385/37 |

FOREIGN PATENT DOCUMENTS

| WO | 0135138 | 5/2001 |
|---|---|---|
| WO | 0216979 | 2/2002 |
| WO | WO 02/18985 | 3/2002 |
| WO | 2015088967 | 6/2015 |

OTHER PUBLICATIONS

Combined Search and Examination Report for GB1519132.3 dated Apr. 25, 2016, 6 pages.

\* cited by examiner

COMMUNICATION APPARATUS

RELATED APPLICATION

This application claims priority to Great Britain patent application GB1519132.3 filed Oct. 29, 2015, the entirety of which is incorporated by reference.

FIELD OF THE INVENTION

The present invention relates to communication and, more particularly, to an apparatus and method for communicating a signal via an optical fiber.

BACKGROUND OF THE INVENTION

Optical communication is a known technique by which data signals can be transmitted from a transmitter to a receiver using optical fiber. Typically, an optical transmitter converts an electrical signal into an optical signal, which forms a carrier wave. The carrier wave is modulated with a modulation signal (i.e. the data), and is then transmitted along the optical fiber to a receiver, which converts the optical signal back into an electrical signal and recovers the transmitted data.

A single optical fiber can be used to transmit a large number of individual data streams, or channels, by transmitting radiation having a range of wavelengths (for example broadband radiation) through the optical fiber, and using a wavelength-division multiplexing (WDM) system to divide the radiation into discrete wavelengths or wavebands. A separate data stream can then be transmitted within each waveband.

In order to recover the data transmitted in one data stream (i.e. in one waveband) within an optical fiber, it is necessary to route the data stream out of the optical fiber to a receiver. One known method for achieving this is through the use of an optical add-drop multiplexer (OADM), which routes one data stream out of the optical fiber, and routes another data stream into the optical fiber to make use of the empty waveband.

Figure 1:
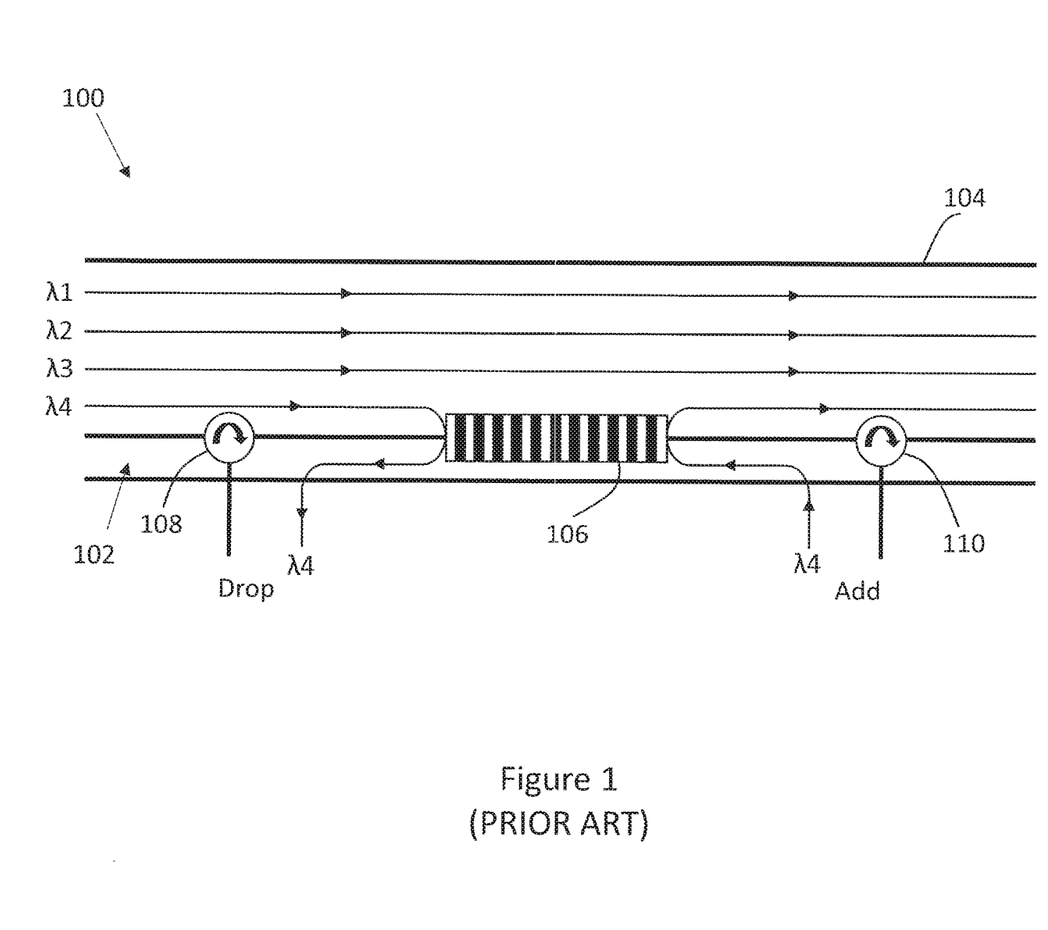
FIG. 1 is an example of an optical system incorporating a known optical add-drop multiplexer.

An example of a system 100 using a known optical add-drop multiplexer (OADM) 102 is shown schematically in FIG. 1. In the exemplary system 100, wavelength-division multiplexing is used to divide the radiation passing through an optical fiber 104 into four discrete wavebands $\lambda 1$, $\lambda 2$, $\lambda 3$ and $\lambda 4$. Each waveband is capable of carrying a single data stream.

An optical fiber grating which, in this case is a fiber Bragg grating (FBG) 106, is formed within the optical fiber 104. A fiber Bragg grating is an optical instrument which can be configured to reflect radiation at a particular wavelength (or in a particular waveband) and to transmit radiation at all other wavelengths. In the example shown in FIG. 1, the FBG 106 is configured to reflect radiation having wavelength within the waveband $\lambda 4$, and transmit all other radiation, including the radiation having wavelengths within the wavebands $\lambda 1$, $\lambda 2$ and $\lambda 3$. Therefore, while the data streams being transmitted in the wavebands $\lambda 1$, $\lambda 2$ and $\lambda 3$ are able to travel along the optical fiber 104 through the FBG 106, the data stream being transmitted in the waveband $\lambda 4$ is reflected by the FBG back along the optical fiber in the direction from which it came.

The reflected radiation is fed into a first optical circulator 108 which routes the reflected radiation out of the optical fiber 104 to a receiver (not shown). The radiation that is routed out of the optical fiber 104 by the OADM 102 is known as a "dropped" path. Since the data stream that was in the waveband $\lambda 4$ has been removed from the optical fiber 104, it is possible to add a new data stream to be transmitted in the waveband $\lambda 4$ (i.e. an "added path"). This is achieved by modulating a carrier wave in the waveband $\lambda 4$, and feeding it into the optical fiber 104 after the FBG 106. In order to provide a carrier wave at the desired wavelength (i.e. in waveband $\lambda 4$), the known system 100 uses a laser (not shown). Radiation at the desired wavelength $\lambda 4$ from the laser is fed into the optical fiber 104, and a second optical circulator 110 routes the radiation along the optical fiber in the original direction of transmission.

A system such as the exemplary system 100 might be positioned at each node in an optical fiber communication network. Such a communication network might be installed in an aircraft, where optical fiber networks are preferred to electric cable networks due to their resilience to electromagnetic interference compared to electrical cables, and due to the fact that optical fibers are generally less heavy than shielded electrical cables. However, for each node in the network to be able to transmit data, each node would require a laser source which itself is very power intensive, and may require an active cooling system. Installing a laser source at each node in a network on an aircraft can negate the benefits provided by the lighter cables.

SUMMARY OF THE INVENTION

A first aspect of the invention provides a communication apparatus, comprising: an optical fiber along which radiation can be transmitted; an optical fiber grating formed within the optical fiber, the optical fiber grating having a structure, and being configured to reflect radiation at a particular wavelength; and an instrument coupled to the grating and configured to controllably modify the structure of the grating, thereby changing the wavelength at which the grating reflects radiation.

An aspect of the invention provides a communication apparatus, comprising: an optical fiber along which radiation can be transmitted; an optical fiber grating formed within the optical fiber, the optical fiber grating having a structure, and being configured to reflect radiation at a particular wavelength; and an instrument coupled to the grating and configured to receive a data signal and controllably modify the structure of the grating in response to the received data signal, thereby changing the wavelength at which the grating reflects radiation, to encode a signal in the radiation at the particular wavelength in response to the received data signal.

The communication apparatus may further comprise a receiver configured to detect the radiation at the particular wavelength reflected by the optical fiber grating and interpret the encoded signal in the radiation at the particular wavelength reflected by the optical fiber grating.

The communication apparatus may further comprise a receiver configured to detect the radiation at the particular wavelength transmitted through the optical fiber grating and interpret the encoded signal in the radiation at the particular wavelength transmitted through the optical fiber grating.

The instrument may be configured to controllably modulate the structure of the grating to modulate the wavelength at which the grating reflects radiation so that the encoded signal is generated.

The apparatus may form a node in an optical fiber network.

The node may further include at least one of: a tilted optical fiber grating and a long-period optical fiber grating, configured to direct radiation out of the optical fiber.

The node may further comprise a receiving module configured to detect radiation directed out of the optical fiber and interpret a communication signal in the radiation directed out of the optical fiber.

The data signal received by the instrument may be the communication signal.

The communication signal may be at a different wavelength and/or wavelength band from the encoded signal.

The instrument may comprise a mechanical instrument configured to controllably apply a strain to the optical fiber grating. The optical fiber housing the optical fiber grating may include a magneto-restrictive coating, and the instrument may be configured to generate a controllable magnetic field capable of interacting with the coating, thereby modifying the structure of the grating.

The instrument may comprise a coil coupled to the optical fiber grating, the coil configured to induce a strain in the grating in response to a current applied to the coil.

The instrument may comprise an instrument configured to controllably apply a pressure or a vibration to the optical fiber grating, or to controllably vary the temperature of the optical fiber grating and/or the optical fiber housing the grating.

Controllably modifying the structure of the grating may comprise controllably modifying the grating spacing or grating period of the optical fiber grating.

The optical fiber grating may comprise a fiber Bragg grating.

The apparatus may be installed in a vehicle, such as an aircraft.

A further aspect of the invention provides a method of communicating a signal via an optical fiber, the method comprising: providing an optical fiber having a first optical fiber grating formed therein, the first optical fiber grating having a structure, and being configured to reflect radiation at a particular wavelength; and operating an instrument coupled to the grating to manipulate the structure of the grating, to thereby change the wavelength at which the first grating reflects radiation. The optical fiber grating may comprise a fiber Bragg grating.

An aspect of the invention provides a method of communicating a signal via an optical fiber, the method comprising: providing an optical fiber having a first optical fiber grating formed therein, the first optical fiber grating having a structure, and being configured to reflect radiation at a particular wavelength; receiving a data signal, operating an instrument coupled to the grating to manipulate the structure of the grating in response to the received data signal, to thereby change the wavelength at which the first grating reflects radiation, to encode a signal in the radiation at the particular wavelength in response to the received data signal.

The method may further comprise: operating a light source to transmit radiation along the optical fiber towards the first optical fiber grating; and receiving, at a receiver, radiation at the particular wavelength reflected by the first optical fiber grating.

The method may further comprise: interpreting a signal received at the receiver from the first optical fiber grating, based on the wavelength of the radiation reflected by the grating.

The method may further comprise: operating the instrument to controllably modulate the structure of the grating to modulate the wavelength at which the grating reflects radiation so that the encoded signal is generated.

The method may further comprise: operating a light source to transmit radiation along the optical fiber towards the first optical fiber grating; and receiving, at a receiver, radiation at the particular wavelength transmitted through the first optical fiber grating.

The method may further comprise: interpreting a signal received at the receiver from the first optical fiber grating, based on the wavelength of the radiation transmitted through the first optical fiber grating.

The method may further comprise: receiving, at a second optical fiber grating, a data signal transmitted via the optical fiber; wherein the manipulation of the structure of the first optical fiber grating is done in response to the receipt of said data signal.

A further aspect of the invention provides a communication system, comprising: an apparatus as described above; a light source for generating radiation to be transmitted along the optical fiber; and a receiver configured to receive radiation reflected by the optical fiber grating. The system may include more than one apparatus and/or more than one light source and/or more than one receiver.

The light source and the receiver may be located at a first end of the optical fiber. The light source may be a swept-wavelength laser, or may be configured to generate broadband radiation.

There are numerous advantages of forming a communication system using optical fiber rather than shielded electrical cable. Optical fiber is generally smaller and lighter than shielded electrical cable. Nodes in an optical communication network can, therefore, also be smaller and lighter. Furthermore, a node which is able to transmit a signal without the use of a laser source to generate radiation at a particular wavelength can be produced for a lower cost than a node which includes a laser source. Such a node is also lighter in weight, and less power-intensive than a node requiring a laser source. If a node in an optical network fails, the other nodes in the network can continue to operate, since the signals transmitted to and from each node are carried in different discrete wavebands. Thus, embodiments of the present invention provide advantages over the known art.

Other features of the invention will be become apparent from the following description.

BRIEF DESCRIPTION OF THE DRAWINGS

Embodiments of the invention will now be described with reference to the accompanying drawings, in which.

DETAILED DESCRIPTION OF EMBODIMENT(S)

Some embodiments of the present invention are described in the context of optical communication systems on aircraft. It will be appreciated by those skilled in the art, however, that the described communication apparatus, methods and systems may be installed in systems other than aircraft. For example, the described systems may be used in buildings or other vehicles, such as motor vehicles.

Figure 2:
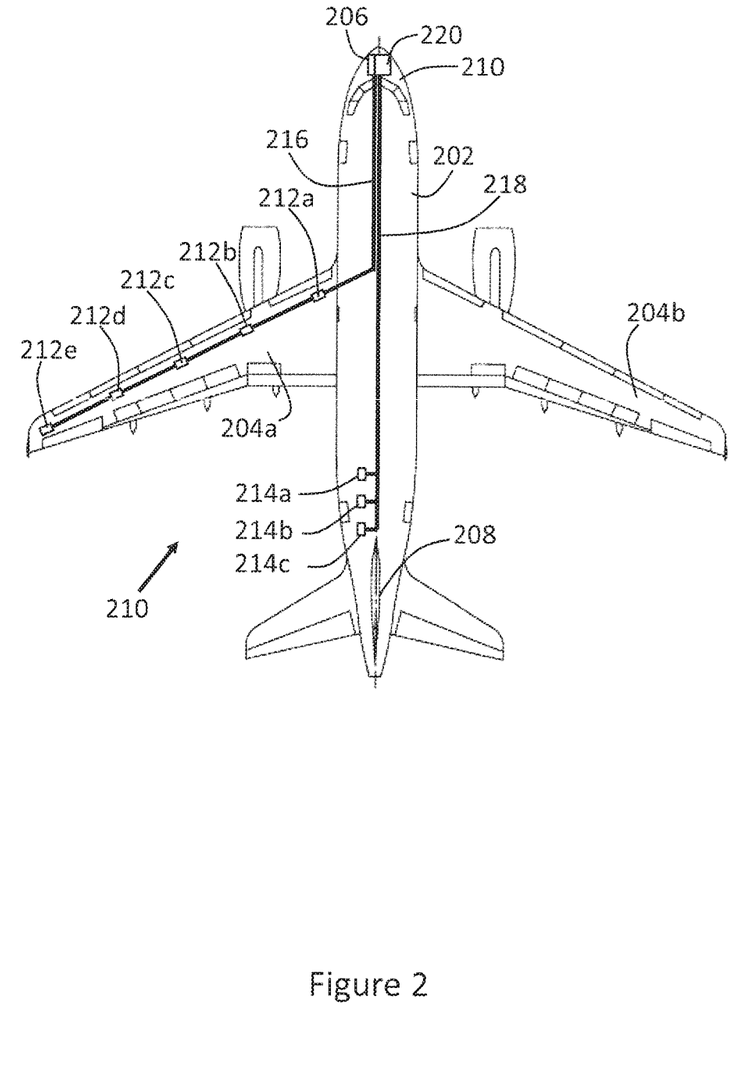
FIG. 2 is a schematic diagram of an optical communication system installed in an aircraft.

Referring to the drawings, FIG. 2 shows an aircraft 200 installed with an optical communication system constructed in accordance with embodiments of the present invention. The aircraft 200 has a fuselage 202 and wings 204a and 204b. A cockpit 206 is located within a front end of the fuselage 202, and a tail 208 is located at the rear end of the fuselage. An avionic system (shown schematically as 210) is located within or near to the cockpit 206, and is configured to communicate with and control components in the aircraft 200.

The aircraft 200 includes an optical communication system via which the avionic system 210 is able to communicate with nodes 212a-e and 214a-c at different locations on the aircraft 200 via optical fibers 216 and 218. In the example shown in FIG. 2, the avionic system 210 is in communication with the nodes 212a-e via the optical fiber 216, and is in communication with the nodes 214a-c via the optical fiber 218. In this example, the nodes 212a-e are spaced along the length of the wing 204a, and each node may include one or more sensors to measure parameters such as, for example, temperature, pressure or strain at a leading edge of the wing. Similarly, the nodes 214a-c are, in this example, located near to the rear end of the fuselage 202, and may each include one or more sensors configured to measure various parameters relating to the aircraft including, for example, air temperature, fuel temperature, fuel level, pressure, rotary position, linear position, landing gear load values, and landing gear strain. One or more of the nodes 212a-e and 214a-c could include individual sensors, or be used as communication nodes for transmitting data, as will be discussed below.

It will be appreciated that, while the exemplary communication system shown in FIG. 2 includes two optical fibers 216 and 218, and eight nodes 212a-e and 214a-c, a typical communication system installed in an aircraft is likely to include a greater number of nodes and a greater number of optical fibers. However, it will also be appreciated that such systems may include fewer optical fibers and fewer nodes.

The exemplary communication system shown in FIG. 2 is configured to communicate data streams via the optical fibers 212, 214 by modulating the data streams onto carrier waves, as will be explained below.

Modulation is the encoding of a signal, for example, a pattern, data, data stream or information to a media, for example radiation, in such a way that the encoded signal may be extracted or retrieved at another point in the media.

A source of radiation, such as light source 220 is, in this example, located near to the avionic system 210 in the aircraft 200. In some embodiments, the light source 220 is a broadband light source which supplies broadband light to the nodes 212a-e, 214a-c via both of the optical fibers 212 and 214. In some embodiments, the source of radiation 220 might include a different type of light source, such as a swept wavelength laser source but, generally, the communication system requires a radiation source capable of generating radiation at multiple wavelengths. It will also be appreciated that while, in this example, the light source 220 is located near to the front of the aircraft 200 with, near to or forming part of the avionic system 210, the light source may alternatively be located elsewhere on the aircraft.

A single light source 220 may be provided to generate light for all of the optical fibers within the communication system. Alternatively, two or more light sources may be provided, and located together on the aircraft 200 or separately, at different locations on the aircraft. Advantageously, the communication system described herein is such that the light source 220, or light sources, can be located at a location remote from the nodes 212, 214. Therefore, the light source 220 can be located, for example, in a protected area of the aircraft, such as an avionics bay. By locating the light source 220 in an area of the aircraft 200 where other electronics systems are located, a single cooling system may be used to cool multiple electrical components, rather than installing a cooling system for each electrical component.

Each node 212, 214 in the communication system may be configured to function as a primitive passive sensor (arranged to measure, for example, temperature or pressure), as a receiver, as a transmitter, or as a sensor and/or a receiver and/or a transmitter. The transmit and receive functionality possible within the nodes will now be discussed with reference to FIGS. 3 to 9 which show, schematically, nodes of a communication system constructed in accordance with various embodiments of the invention.

Figure 3:
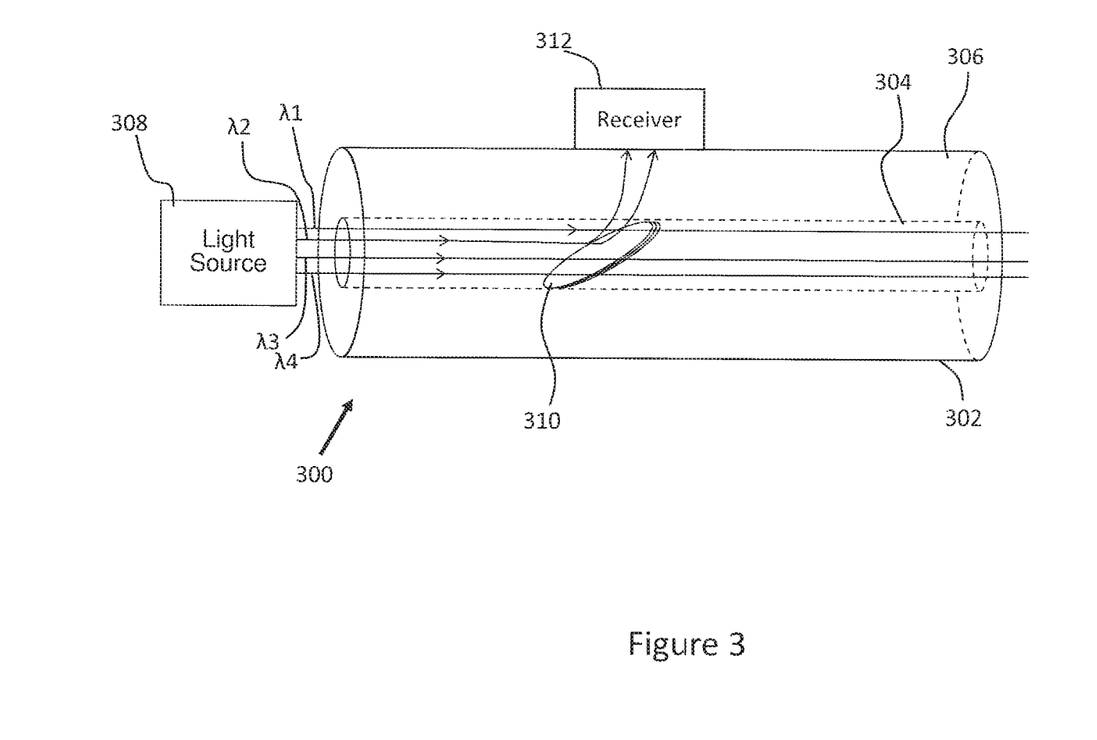
FIG. 3 is a schematic diagram of a node in an optical communication system configured to function as a receiver in accordance with an embodiment of the invention.
Figure 4:
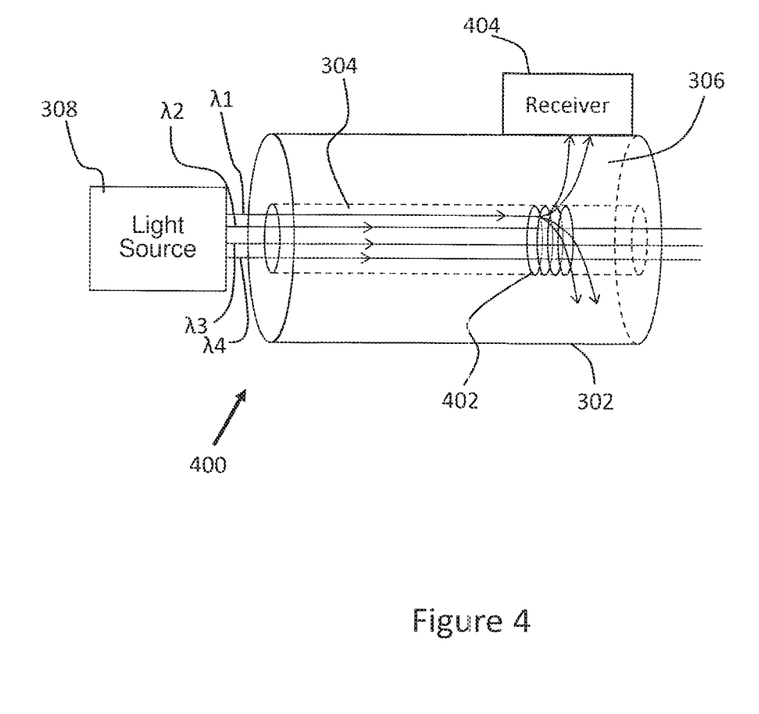
FIG. 4 is a schematic diagram of a node in an optical communication system configured to function as a receiver in accordance with another embodiment of the invention.

FIGS. 3 and 4 show arrangements in which nodes can function as receivers. FIG. 3 shows a portion of an optical fiber 302 having a core 304 and cladding 306. A light source 308 is located at an end of the optical fiber 302, and is configured to generate broadband (white) light for transmission along the optical fiber. The light source 308 may be the same as the light source 220 shown in FIG. 2. The broadband light emitted by the light source 308 is divided into multiple wavebands using known wavelength division multiplexing (WDM) techniques. In some embodiments, a coarse-WDM technique may be employed to divide the broadband light into around sixteen to twenty wavebands, or channels. In other embodiments, a fine-WDM technique may be employed to divide the broadband light into around thirty wavebands, or channels. Alternatively, different WDM techniques may be used to divide the light into a different number of wavebands or channels. It will be appreciated that, by using different WDM techniques, the broadband light from the light source 308 may be divided into more or fewer wavebands, as required. For clarity, the light emitted by the light source 308 in this embodiment has been divided into four wavebands. The light within each individual waveband may act as a carrier wave via which a data signal may be transmitted.

A data signal to be transmitted along the optical fiber 302 is modulated onto a carrier wave using techniques that will be well known to those skilled in the art. A resulting modulated data stream can then be transmitted along the optical fiber 302. In the embodiments discussed in FIGS. 3 and 4, data streams are transmitted along the optical fiber 302 in the two wavebands labelled $\lambda1$ and $\lambda2$, and the nodes shown in FIGS. 3 and 4 are configured to function as receivers.

In the embodiment shown in FIG. 3, a node 300 is shown in which an optical fiber grating is formed. In this embodiment, the grating is a tilted fiber Bragg grating (FBG) 310, which is formed within the core 304 of the optical fiber 302.

FBGs can be created in optical fibers using techniques that will be known to those skilled in the art, such as laser etching or inscribing. Generally, FBGs are configured to reflect radiation at a particular wavelength (or in a particular waveband) and to transmit radiation at all other wavelengths. Therefore, when white light travels along an optical fiber in one direction and reaches an FBG, a component of that white light is reflected back along the optical fiber in the opposite direction. The tilted FBG 310 reflects a component of the light (in this case, the light in the waveband λ2) out of the core 304 and through the cladding 306 of the optical fiber 302. A receiver 312 adjacent to, near to, or around the optical fiber 302 receives the reflected light, and can be used to recover the data from the data stream. The receiver 312 may be a photodetector, such as a photodiode, used to detect a signal transmitted, for example, from the avionics bay or cockpit of an aircraft. The transmitted signal may, for example, be an instruction to a particular component, such as to turn a component on or off. Alternatively, the transmitted signal may be used, for example, to activate an in-line switch.

FIG. 4 shows a node 400 constructed according to an alternative embodiment, in which a long-period FBG 402 is formed within the core 304 of the optical fiber 302. The long-period FBG 402 affects only radiation having a wavelength within a particular waveband (in this case, the component of light in the waveband λ1), and transmits radiation at all other wavelengths. Some modes from the core 304 of the optical fiber 302 (the "core modes") couple with modes from the cladding 306 (the "cladding modes"). As a result, the component of light in the waveband λ1 and, therefore, the data stream transmitted in this waveband, is coupled outside the core 304 and, therefore, travels into the cladding 306 of the optical fiber 302. A receiver 404 adjacent to, near to, or around the optical fiber 302 receives the reflected light, and can be used to recover the data from the data stream. As with the receiver 312, the receiver 404 may be a photodetector, such as a photodiode or phototransistor, used to detect a signal transmitted, for example, from the avionics bay or cockpit of an aircraft. To aid transmission of radiation through the cladding 306 of the optical fiber 302, a coating may be applied to at least a portion of the optical fiber. Alternatively, the optical fiber 302 may be treated in some other way, or part of the cladding 306 may be removed.

The arrangements shown in FIGS. 3 and 4 demonstrate how the use of FBGs allows nodes of an optical communication system to be used as receivers. The present invention also provides a mechanism by which a node can function as a transmitter, such that data can be transmitted from the node without the use of a laser source.

The wavelength at which an FBG reflects radiation is determined by the structure of the grating or, more specifically, by the spacing or period of the grating. Changing the structure of an FBG, for example by increasing or decreasing the grating spacing, changes the wavelength at which the FBG reflects radiation. The structure of an FBG can be changed or manipulated in a number of ways. For example, changing the temperature of the FBG can cause the grating spacing to change, with the result that radiation of a different wavelength will be reflected by the FBG. Another way of changing the structure of an FBG is to apply a force or strain to the FBG, for example by using a mechanical device to deform the grating through application of a tensile or a compressive force. In this way, the grating spacing is changed, resulting in a change in the wavelength at which the grating reflects radiation.

Figure 5A:
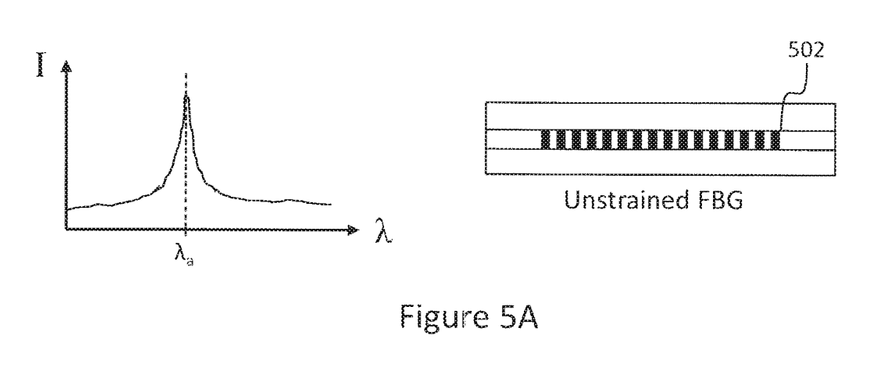
FIGS. 5A and 5B are graphs showing the effect of applying a strain to a fiber Bragg grating.
Figure 5B:
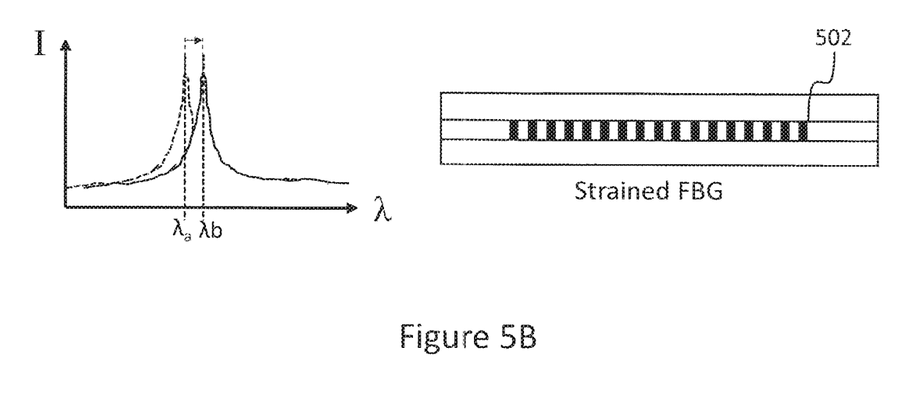

The effect of changing the grating spacing in an FBG on the wavelength at which radiation is reflected by the FBG is shown schematically in FIGS. 5A and 5B. In FIG. 5A, an FBG 502 is in an unstrained form and, in this form, the FBG reflects radiation having a wavelength $\lambda_a$. FIG. 5B shows the FBG 502 under strain. In this form, the FBG 502 reflects radiation having a wavelength $\lambda_b$, different to $\lambda_a$. Thus, by controlling the amount of strain applied to an FBG, it is possible to accurately control the wavelength at which radiation is reflected by the FBG.

Figure 6:
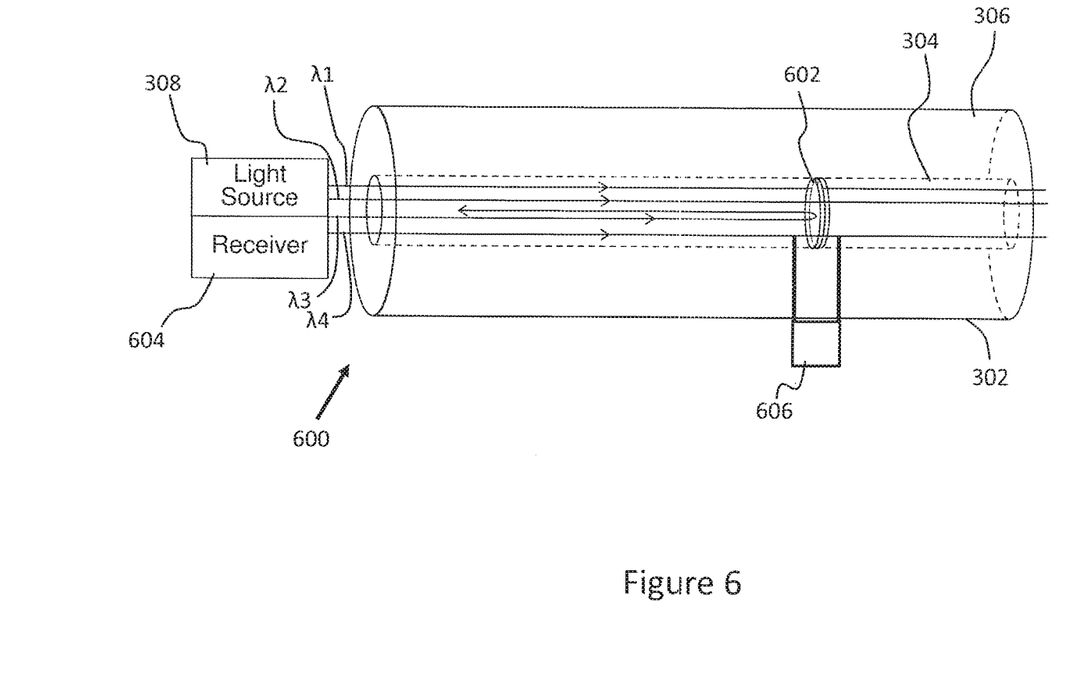
FIG. 6 is a schematic diagram of a node in an optical communication system configured to function as a transmitter in accordance with an embodiment of the invention.

FIG. 6 shows an embodiment of the invention in which a node 600 can be used to transmit a signal. In the embodiment shown in FIG. 6, an FBG 602 is formed within the core 304 of the optical fiber 302. The FBG 602 is configured to reflect radiation having a wavelength within in the waveband λ3, and transmit all other radiation, including the radiation having wavelengths falling within the wavebands λ1, λ2 and λ4.

A receiver 604 is located adjacent to or near to the light source 308, at the end of the optical fiber 302. An advantage of this arrangement, as is discussed above, is that the light source 308 and the receiver 604 can be located near to each other, for example in the avionics bay of an aircraft, remote from the nodes.

As with the embodiments described above, the light source 308 in this embodiment is configured to generate broadband light (e.g. white light). Light having wavelengths falling within the wavebands used to transmit data streams to nodes functioning as receivers may be modulated with data. However, the light having a wavelength falling within the waveband λ3 is not modulated with data. Instead, the white light is transmitted along the optical fiber 302 to the FBG 602 where the component of the white light within the waveband λ3 is reflected.

A mechanism or instrument 606 for manipulating, modifying or modulating the structure of the FBG 602 is coupled to the FBG. The instrument 606 may be any means suitable for controllably modifying or modulating the grating spacing of the FBG 602 including, but not limited to, a mechanical device, an electrical device, a current-inducing coil, a motor, such as a linear solenoid motor, or a magnetic field source, such as a coil, a radio frequency (RF) transmitter or a microwave transmitter, for generating a magnetic field to interact with a magneto-restrictive coating applied to a portion of the optical fiber containing the FBG. An example of a suitable instrument 606 is discussed below with reference to FIG. 7. In general, however, the instrument 606, and its effect on the FBG 602, may be accurately controlled and, accordingly, it is possible to accurately control the wavelength of radiation that is reflected by the FBG, back along the optical fiber 302, to the receiver 604.

Using the arrangement shown in FIG. 6, a signal having a particular wavelength can be transmitted by the node 600 to the receiver 604. The receiver 604, or a computer or processor associated with the receiver, may be programmed with threshold values of wavelengths or discrete bands of wavelengths so that, if a signal is received from the node 600 above a particular threshold value, or falling within a particular wavelength band, it can be interpreted accordingly. For example, a received signal having a wavelength falling above a threshold value may be interpreted as a "1" or "ON" response, indicating that a particular component associated with that node is in an "ON" or active state. A received signal having a wavelength falling below the threshold value may be interpreted as a "0" or "OFF" response, indicating that a particular component associated with that node is in an "OFF" or inactive state.

According to various embodiments of the invention, one or more instruments may be used to varying parameters of the grating, or to affect the grating in different ways. For example, in one embodiment, the instrument is configured to controllably apply pressure to the FBG, thereby modulating the structure of the grating. In another embodiment, the instrument is configured to controllably apply a vibration to the FBG to modulate the grating's structure. In yet another embodiment, the instrument is configured to controllably vary the temperature of the FBG, and/or of the optical fiber which houses the FBG. Varying the temperature of the FBG can change the structure of the grating.

Figure 7:
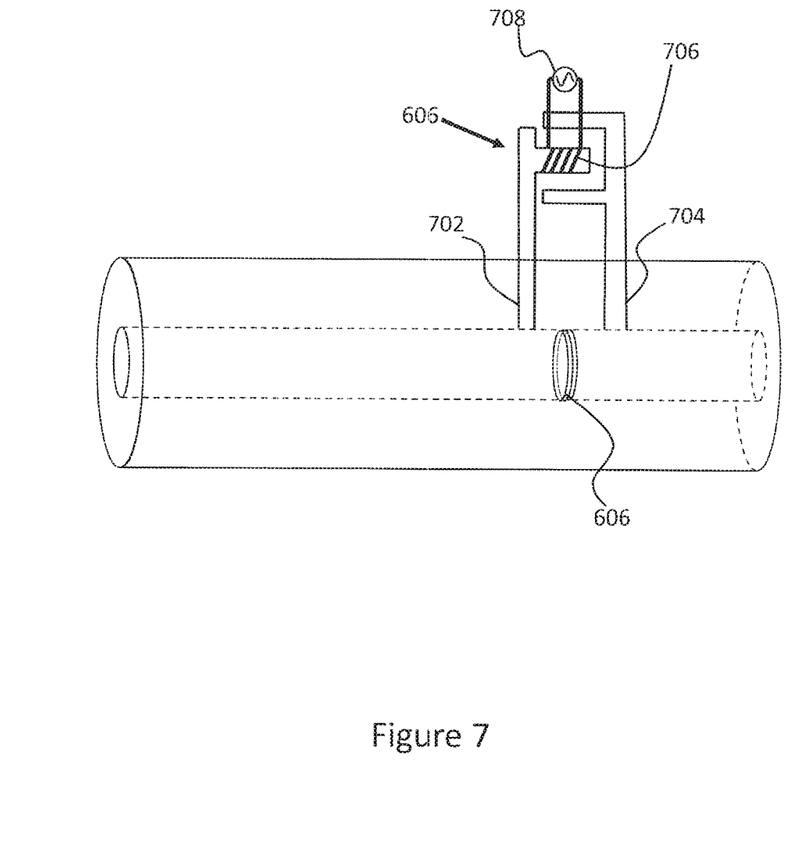
FIG. 7 is a schematic diagram of an instrument used to manipulate a grating.

FIG. 7 shows an embodiment of the invention in which the instrument 606 is a mechanical instrument capable of applying a strain to the FBG 602. In this embodiment, the instrument 606 includes a first end 702 mechanically coupled to the optical fiber at one end of the FBG 602 and a second end 704 mechanically coupled to the optical fiber at the other end of the FBG. The instrument 606 includes a coil 706 connected to a data source, for example a current source 708. The arrangement is analogous to a speaker coil arrangement. When a current is applied to the coil, a motive force is induced in the instrument, causing the first and second ends 702, 704 of the instrument to move relative to one another. This movement causes a strain to be applied to the FBG 602, thereby modifying the grating spacing.

In another embodiment (not shown), a magneto-restrictive coating is applied to the FBG, or to the portion of the optical fiber that houses the FBG. Magneto-restrictive materials change their shape or dimensions when they are subject to a magnetic field. The instrument includes means for generating a magnetic field, such as a radio frequency (RF) transmitter or a microwave transmitter. A controllable magnetic field is generated and, when the FBG is positioned in the magnetic field, the magneto-restrictive coating changes its shape, causing the structure of the FBG to be modified. By accurately controlling the strength of the magnetic field (for example by controlling a supply voltage or current), it is possible to accurately control the strain induced on the FBG and, therefore, the change in the grating spacing of the FBG.

Figure 8:
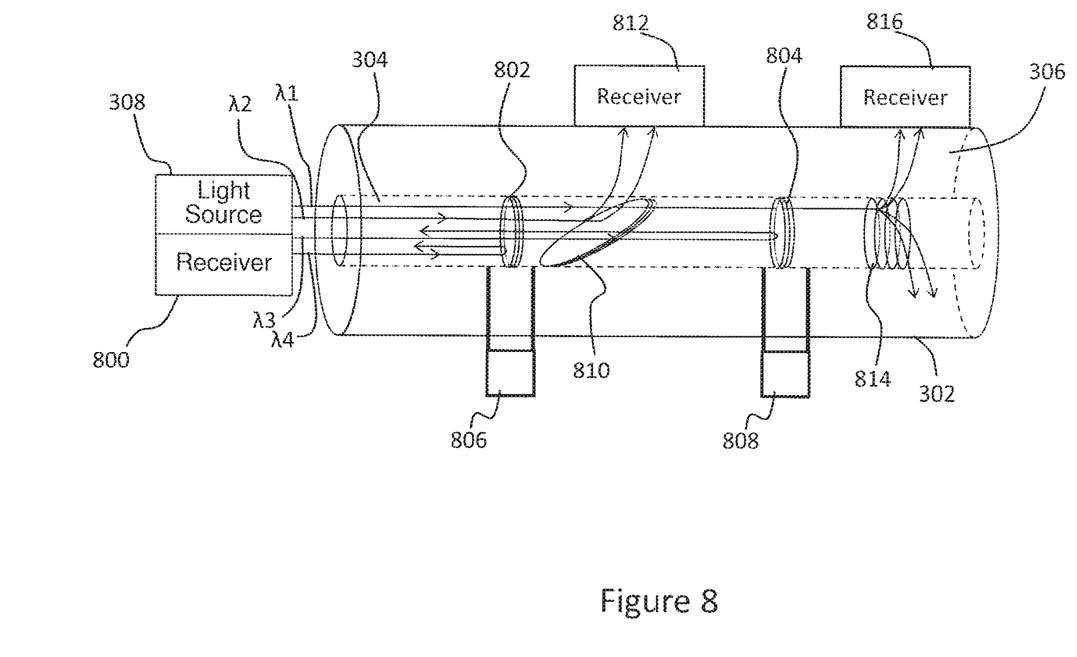
FIG. 8 is a schematic diagram of an optical fiber including two nodes forming part of an optical communication system.

FIG. 8 shows an embodiment of the invention in which a light source 308 is located at one end of the optical fiber 302, along with a receiver 800. Four FBGs are formed within the core 304 of the optical fiber 302. FBGs 802 and 804 are similar to the FBG 602 described above, in that their structures can be controllably manipulated by instruments 806 and 808 respectively. The FBG 802 is configured to reflect light having a wavelength falling within the waveband λ4, and FBG 804 is configured to reflect light having a wavelength falling within the waveband λ3. Tilted FBG 810 is similar to the tilted FBG 310 described above, and is configured to reflect light having a wavelength falling within the waveband λ2 towards a receiver 812. The long-period FBG 814 is similar to the long-period FBG 402 described above, and is configured to reflect light having a wavelength falling within the waveband λ1 towards a receiver 816. In this embodiment, the FBG 802 and the tilted FBG 810 are located near to one another on a first node, and the FBG 804 and the long-period FBG 814 are located near to one another on a second node. Thus, at the first node, a signal may be received by the receiver 812 and, in response to the received signal, a response signal may be transmitted to the receiver 800 from the FBG 802, using the instrument 806 to control its grating spacing. Similarly, at the second node, a signal may be received by the receiver 816 and, in response to the received signal, a response signal may be transmitted to the receiver 800 from the FBG 804, using the instrument 808 to control its grating spacing. Alternatively, the signal received at the receivers 812, 816 may be in response to the signal transmitted to the receiver 800 from the FBGs 802, 804 resulting from the modulation by the instruments 806, 808.

Figure 9A:
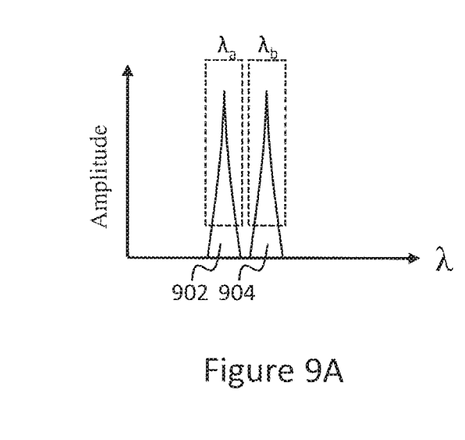
FIGS. 9A, 9B and 9C show example responses of a node functioning as a transmitter.
Figure 9B:
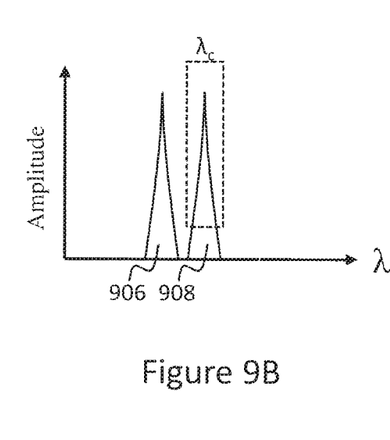
Figure 9C:
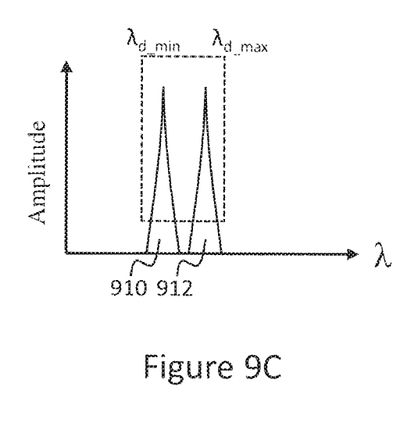

By using the apparatus and system described above, it is possible to transmit both digital and analogue data from a node in an optical fiber, without the use of a laser source or electrically powered components. FIGS. 9A, 9B and 9C show examples of possible responses from a node functioning as a transmitter, as described above.

FIG. 9A shows a first set of responses. In this example, a data signal generated by a binary node can represent an "ON" state or an "OFF" state. The receiver interprets a response 902 (which has a wavelength falling within a waveband $\lambda_a$) as meaning "ON", and interprets a response 904 (which has a wavelength falling within a waveband $\lambda_b$) as meaning "OFF". A response having any other wavelength might be interpreted as an error message, suggesting that something unexpected has happened at the node, such as a short circuit or a power surge.

FIG. 9B shows a second set of responses. In this example, the receiver scans for a response 908 falling within a single waveband $\lambda_c$. A response within the waveband $\lambda_c$ would be interpreted as meaning "ON", while a response such as response 906, which has a wavelength falling outside of the waveband $\lambda_c$, or a lack of a response at all, would be interpreted as meaning "OFF".

FIG. 9C shows a third set of responses. In this example, a wider waveband is scanned and the actual response wavelength is determined in an analogue way between a minimum $\lambda_{d\_min}$ and maximum point $\lambda_{d\_max}$. Responses 910 and 912 therefore represent analogue points on a continuous scale and may represent non-binary data such as a current measurement or samples in an audio signal. Such an audio signal may be the result of analogue passive components and/or energy harvesting techniques, allowing zero-power data communication to be made from the node.

Figure 10:
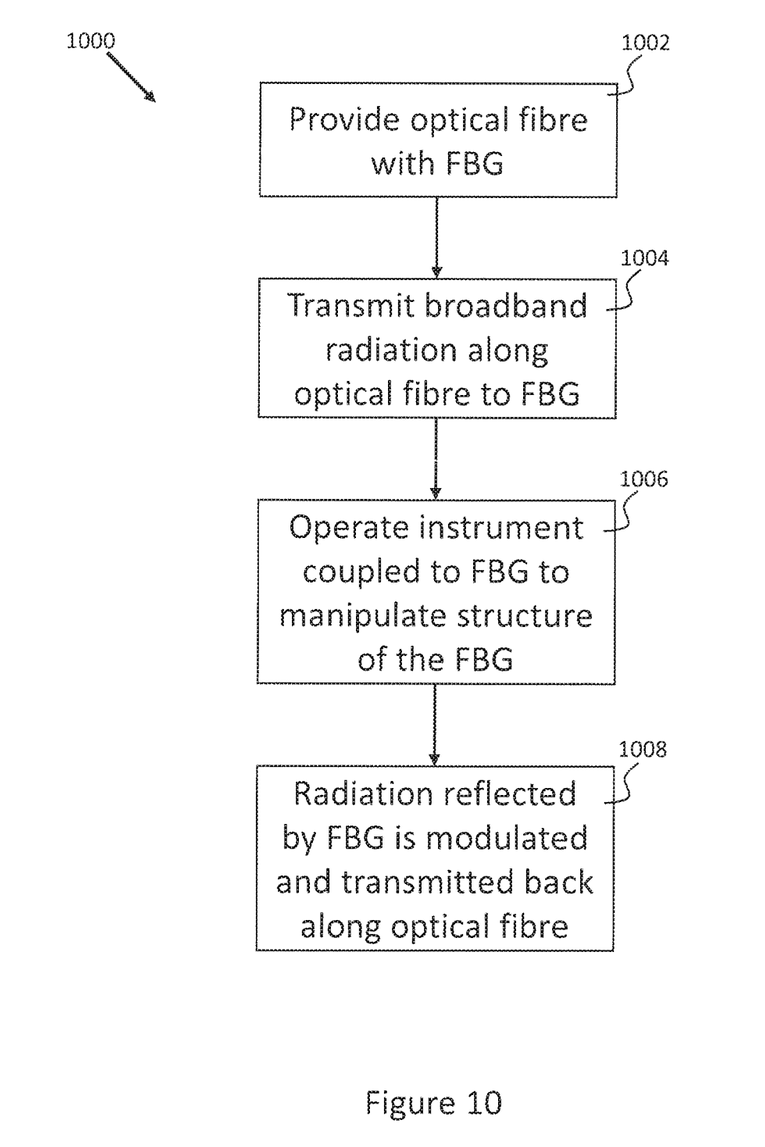
FIG. 10 is a flow diagram showing the steps of a method for transmitting data in accordance with the present invention.

The invention also provides a method for communicating a signal via an optical fiber. FIG. 10 is a flow diagram detailing the steps of the method 1000.

At step 1002, an optical fiber is provided. The optical fiber includes an optical fiber grating. In this embodiment, the grating is fiber Bragg grating (FBG) which is formed within the core of the optical fiber. At step 1004, a light source may be used to transmit broadband radiation along the optical fiber towards the FBG. At step 1006, an instrument that is coupled to the FBG is operated to controllably manipulate the structure of the FBG. At step 1008, radiation having a particular wavelength is reflected by the FBG, modulated by the instrument, and transmitted back along the optical fiber to a receiver.

Those skilled in the art of optical communications will appreciate that the apparatus, methods and systems described herein may be used to communicate digital data signals or analogue data signals. It will also be appreciated that, while fiber Bragg gratings (FBGs) have been referred to in some specific embodiments, other types of optical fiber gratings known to those skilled in the art could be used.

Although the invention has been described above with reference to one or more embodiments, it will be appreciated that various changes or modifications may be made without departing from the scope of the invention as defined in the appended claims. Furthermore, embodiments of the invention may be combined with one another, and features from individual embodiments may be combined with features from other embodiments without departing from the scope of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A communication apparatus, comprising:
   an optical fiber along which radiation can be transmitted;
   an optical fiber grating formed within the optical fiber, the optical fiber grating having a structure, and being configured to reflect radiation at a particular wavelength; and
   an instrument coupled to the grating and configured to receive a data signal and controllably modify the structure of the grating in response to the received data signal, thereby changing the particular wavelength at which the grating reflects radiation, to encode a signal in the radiation at the particular wavelength in response to the received data signal.

2. The communication apparatus according to claim 1, further comprising a receiver configured to detect the radiation at the particular wavelength reflected by the optical fiber grating and interpret the encoded signal in the radiation at the particular wavelength reflected by the optical fiber grating.

3. The communication apparatus according to claim 1, further comprising a receiver configured to detect the radiation at the particular wavelength transmitted through the optical fiber grating and interpret the encoded signal in the radiation at the particular wavelength transmitted through the optical fiber grating.

4. The communication apparatus according to claim 1, wherein the instrument is configured to controllably modulate the structure of the grating to modulate the wavelength at which the grating reflects radiation so that the encoded signal is generated.

5. The communication apparatus according claim 1, wherein the apparatus forms a node in an optical fiber network.

6. The communication apparatus according to claim 5, wherein the node further includes at least one of: a tilted optical fiber grating and a long-period optical fiber grating, configured to direct radiation out of the optical fiber.

7. The communication apparatus according to claim 6, wherein the node further comprises a receiving module configured to detect radiation directed out of the optical fiber and interpret a communication signal in the radiation directed out of the optical fiber.

8. The communication apparatus according to claim 7, wherein the data signal received by the instrument is the communication signal.

9. The communication apparatus according to claim 8, wherein the communication signal is at a different wavelength and/or wavelength band from the encoded signal.

10. The communication apparatus according to claim 1, wherein the instrument comprises a mechanical instrument configured to controllably apply a strain to the optical fiber grating.

11. The communication apparatus according to claim 1, wherein the optical fiber housing the optical fiber grating includes a magneto-restrictive coating, and the instrument is configured to generate a controllable magnetic field capable of interacting with the coating, to thereby modifying the structure of the grating.

12. The communication apparatus according to claim 1, wherein the instrument comprises a coil coupled to the optical fiber grating, the coil configured to induce a strain in the grating in response to a current applied to the coil.

13. The communication apparatus according to claim 1, wherein the instrument comprises an instrument configured to controllably apply a pressure to the optical fiber grating.

14. The communication apparatus according to claim 1, wherein the instrument comprises an instrument configured to controllably apply a vibration to the optical fiber grating.

15. The communication apparatus according to claim 1, wherein the instrument comprises an instrument configured to controllably vary the temperature of the optical fiber grating and/or the optical fiber housing the grating.

16. The communication apparatus according to claim 1, wherein controllably modifying the structure of the grating comprises controllably modifying the grating spacing of the optical fiber grating.

17. The communication apparatus according to claim 1, wherein the optical fiber grating comprises a fiber Bragg grating.

18. The communication apparatus according to claim 1, wherein the apparatus is installed in a vehicle.

19. The communication apparatus according to claim 1, wherein the apparatus is installed in an aircraft.

20. A communication system, comprising:
    an apparatus according to any claim 1; and
    a light source for generating radiation to be transmitted along the optical fiber.

21. The communication system according to claim 20, wherein the light source is a swept-wavelength laser, or is configured to generate broadband radiation.

22. A method of communicating a signal via an optical fiber, the method comprising:
    providing an optical fiber having a first optical fiber grating formed therein, the first optical fiber grating having a structure, and being configured to reflect radiation at a particular wavelength;
    receiving a data signal,
    operating an instrument coupled to the grating to manipulate the structure of the grating in response to the received data signal, to thereby change the wavelength at which the first grating reflects radiation, to encode a signal in the radiation at the particular wavelength in response to the received data signal.

23. The method according to claim 22, further comprising:
    operating a light source to transmit radiation along the optical fiber towards the first optical fiber grating; and
    receiving, at a receiver, radiation at the particular wavelength reflected by the first optical fiber grating.

24. The method according to claim 23, further comprising interpreting a signal received at the receiver from the first optical fiber grating, based on the wavelength of the radiation reflected by the grating.

25. The method according to claim 23, further comprising interpreting a signal received at the receiver from the first optical fiber grating, based on the wavelength of the radiation transmitted through the first optical fiber grating.

26. The method according to claim 22, further comprising operating the instrument to controllably modulate the structure of the grating to modulate the wavelength at which the grating reflects radiation so that the encoded signal is generated.

27. The method according to claim 22, further comprising:
operating a light source to transmit radiation along the optical fiber towards the first optical fiber grating; and
receiving, at a receiver, radiation at the particular wavelength transmitted through the first optical fiber grating.

28. The method according to claim 22, further comprising:
receiving, at a second optical fiber grating, a data signal transmitted via the optical fiber;
wherein the manipulation of the structure of the first optical fiber grating is done in response to the receipt of said data signal.

29. The method according to claim 22, further comprising receiving, at a second optical fiber grating, a data signal transmitted via the optical fiber;
wherein the data signal is received at the second optical fiber grating in response to the manipulation of the structure of the first optical fiber grating.

30. The method according to claim 22, wherein the optical fiber grating comprises a fiber Bragg grating.

* * * * *